US006779713B1

(12) United States Patent
Emmons et al.

(10) Patent No.: US 6,779,713 B1
(45) Date of Patent: Aug. 24, 2004

(54) JOINING OF COMPOSITE BERYLLIUM-ALUMINUM PARTS

(75) Inventors: John L. Emmons, Los Altos, CA (US); Robert E. Hardesty, San Ramon, CA (US)

(73) Assignee: The Peregrine Falcon Corporation, Pleasanton, CA (US)

(*) Notice: Subject to any disclaimer, the term of this patent is extended or adjusted under 35 U.S.C. 154(b) by 0 days.

(21) Appl. No.: 10/409,889

(22) Filed: Apr. 8, 2003

(51) Int. Cl.[7] .......................... B23K 1/19; B23K 20/16; B23K 15/10
(52) U.S. Cl. ..................... 228/262.51; 228/262.1; 228/262.5; 428/654
(58) Field of Search ................ 228/206, 208, 228/262.1, 262.5, 262.51; 148/24, 437, 442; 428/649, 650, 654–656; 420/401, 428

(56) References Cited

U.S. PATENT DOCUMENTS

| | | | |
|---|---|---|---|
| 4,172,181 A | * 10/1979 | Kawase et al. | 428/654 |
| 5,263,640 A | * 11/1993 | Mahoney et al. | 228/190 |
| 5,470,014 A | * 11/1995 | Pritchard et al. | 228/262.51 |
| 5,615,826 A | 4/1997 | Dixon et al. | 228/208 |
| 5,716,467 A | 2/1998 | Marder et al. | 745/549 |
| 5,901,336 A | * 5/1999 | Dombrowski | 419/6 |
| 6,312,534 B1 | 11/2001 | Grensing | 148/437 |
| 6,543,678 B1 | * 4/2003 | Emmons et al. | 228/262.51 |

FOREIGN PATENT DOCUMENTS

WO     WO 02/12590 A1 * 2/2002

OTHER PUBLICATIONS

Quarterly Newsletter of AlumniPlate, Inc., "Aluminations", vol. 2.3, Fall '97, 2 pages.*
Annual Book of ASTM Standards, "Standard Test Method for Apparent Shear Strength of Single–Lap–Joint Adhesively Bonded Metal Specimens by Tension Loading (Metal–To–Metal)", vol. 03.01, Desig. D. 1002–94, 4 pgs.*
Annual Book of ASTM Standards, "Standard Guide for Preparation of Meta Surfaces for Adhesive Bonding", Desig. D 251–90, Publ. Jan. 2001, 6 pgs.*

* cited by examiner

Primary Examiner—L. Edmondson
(74) Attorney, Agent, or Firm—Thomas Schneck; David M. Schneck

(57) ABSTRACT

A method for joining metal parts in which an aluminum rich surface is produced on a first metal part by selective removal of the beryllium component of a beryllium-aluminum alloy, as by said etching. The aluminum rich surface may then be joined to another aluminum rich surface by a brazing.

11 Claims, 3 Drawing Sheets

Fig._ 1

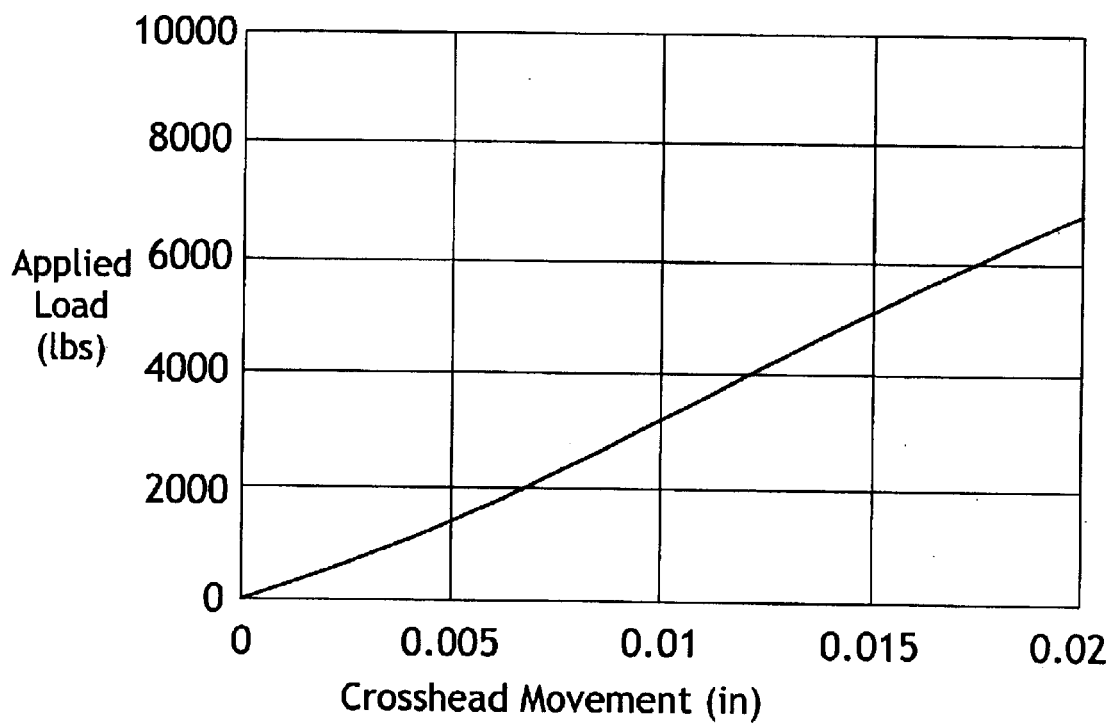
Fig._ 4
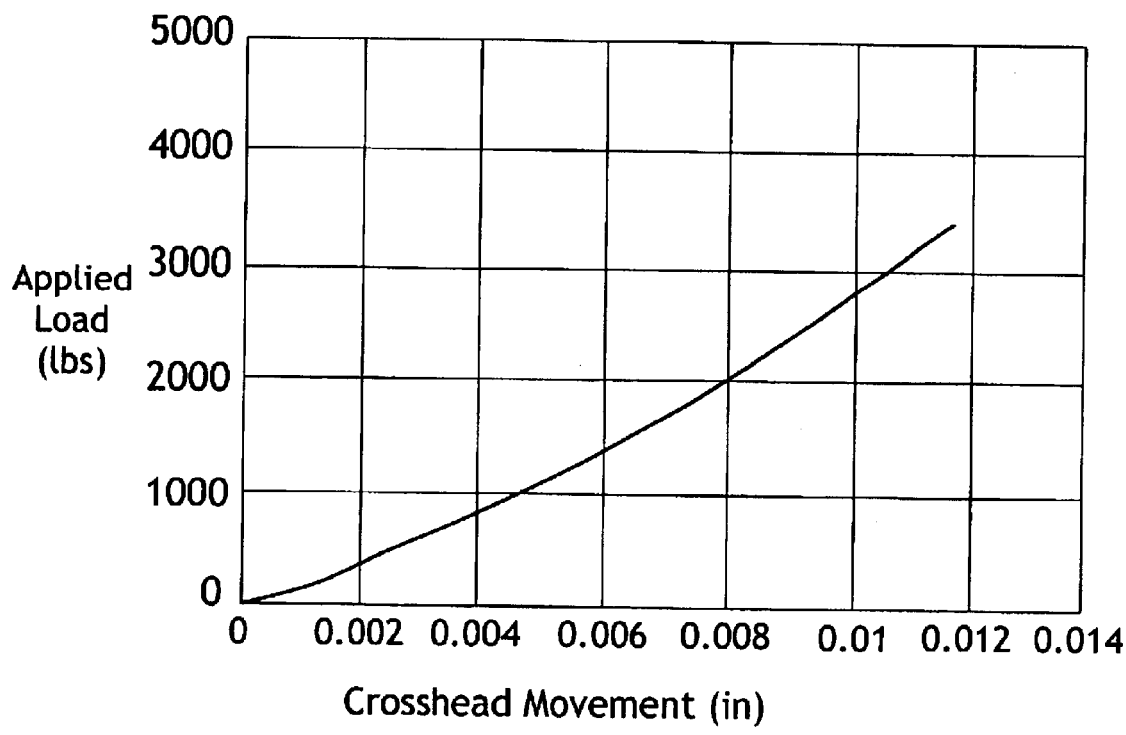
Fig._ 5

JOINING OF COMPOSITE BERYLLIUM-ALUMINUM PARTS

TECHNICAL FIELD

The present invention relates in general to a method for joining metal parts, and specifically to a method for joining metal parts at least one of which is composed of a beryllium-aluminum alloy.

BACKGROUND OF THE INVENTION

Beryllium-Aluminum alloys provide an advantageous material for a number of applications, including uses in aerospace and electronics. The low weight and high stiffness of these alloys allow use of this material in these applications. These alloys are characterized by their high fatigue strength, high heat capacitance, moderately low coefficient of thermal expansion, high thermal transfer, high stiffness, and low weight.

One present problem in the use of beryllium-aluminum alloys (Be—Al alloys) is the difficulty in joining parts made of this alloy. Be—Al alloys have a surface oxide layer, which makes it difficult to join or coat this surface. To deal with this problem, prior attempts to join Be—Al alloy parts have used mechanical joining, adhesive bonding, or dip brazing. Mechanical joining (e.g. by threaded attachments, nuts and bolts) may localize the strength of attachment, add significant weight to the structure and provide a more uneven thermal profile. Adhesive bonding of Be—Al parts does not provide sufficient mechanical strength for many applications, and does not provide a uniform media for thermal transfer, and does not provide uniform material for thermal expansion.

Dip brazing of Be—Al parts requires that these parts be precisely constructed to form narrow faying surfaces and small joint gaps at the joined surfaces to retain the brazing alloy in the joint gaps during the brazing process. To form a moderate to complex assembly, it is difficult to manufacture parts that would allow adequate braze fillet formation. Braze fillets are advantageous in Be—Al part assembly where narrow faying surfaces exist because joint stresses are carried by these fillets, rather than by the narrow faying surfaces. In addition, dip brazing subjects the Be—Al parts to the conditions of the molten dip bath. This process can result in distortion of the part shape, or alternatively can produce substantial deposits of entrapped flux, further adding to part weight.

One method to join Be—Al parts is set out in U.S. patent application Ser. No. 08/939,762. In this method the surfaces of Be—Al parts are cleaned and placed together to form a part assembly. A braze alloy is placed at the joint locations and a braze flux is applied to braze alloy. In one embodiment this braze flux contains aluminum fluoride and lithium fluoride (for example in the range of 2–54% and 2–69% respectively). Alternatively, the braze flux may contain potassium chloride, aluminum fluoride, sodium chloride, sodium fluoride, and lithium fluoride.

One solution to this problem, disclosed in U.S. Pat. No. 5,470,014 has been to treat the Be—Al alloy part with an ion vapor deposition of aluminum to enrich the surface with aluminum atoms. The aluminum-enriched surface may then be joined to another aluminum rich surface using conventional means, such as vacuum brazing. An alternative is disclosed in U.S. Pat. No. 5,615,826. In this method, an aluminum alloy is coated onto a beryllium surface, as by gas metal arc welding. The beryllium surface coated with aluminum is then brought into contact with another beryllium surface. The aluminum alloy is then welded to attach the two beryllium surfaces together. The aluminum surface may be subjected to elevated temperatures and pressures to reduce porosity before the parts are attached together. The aluminum alloy coated beryllium may be shaped into a desired welding joint configuration prior to welding. All of the above patents are incorporated by reference in their entirety.

It would be advantageous to have an alternative method for attachment Be—Al alloy parts that provides a uniform, high strength attachment of such parts.

SUMMARY OF THE INVENTION

The present invention is a process for the joining of Be—Al alloy parts. The beryllium component of a Be—Al alloy part is selectively removed from a surface. This selective removal, such as by acid etching, produces an aluminum enriched surface. This aluminum-enriched surface may then be attached to another aluminum-enriched surface by conventional aluminum attachment methods. Fluxless vacuum brazing of the aluminum enriched surfaces is one useful method for attachment of parts.

BRIEF DESCRIPTION OF THE DRAWINGS

FIG. 4 is a graph of a loading curve for brazed Be—Al alloy parts.

FIG. 5 is a graph of a loading curve for bonded Be—Al alloy parts.

DETAILED DESCRIPTION OF THE INVENTION

For the purposes of the present invention, Be—Al alloys may, for example contain between 20% and 65% beryllium by weight, with the balance of the alloy comprised of aluminum. One example is AlBeMet AM 162, which is 62% by weight beryllium and 38% aluminum. Beryllium and aluminum may be formed into an alloy in a number of methods. These include formation by combination of beryllium and aluminum particles bound together by hot static pressing, forming a composite material. Alternatively beryllium and aluminum may be formed by extrusion and rolling of the particle mixture.

Figure 1:
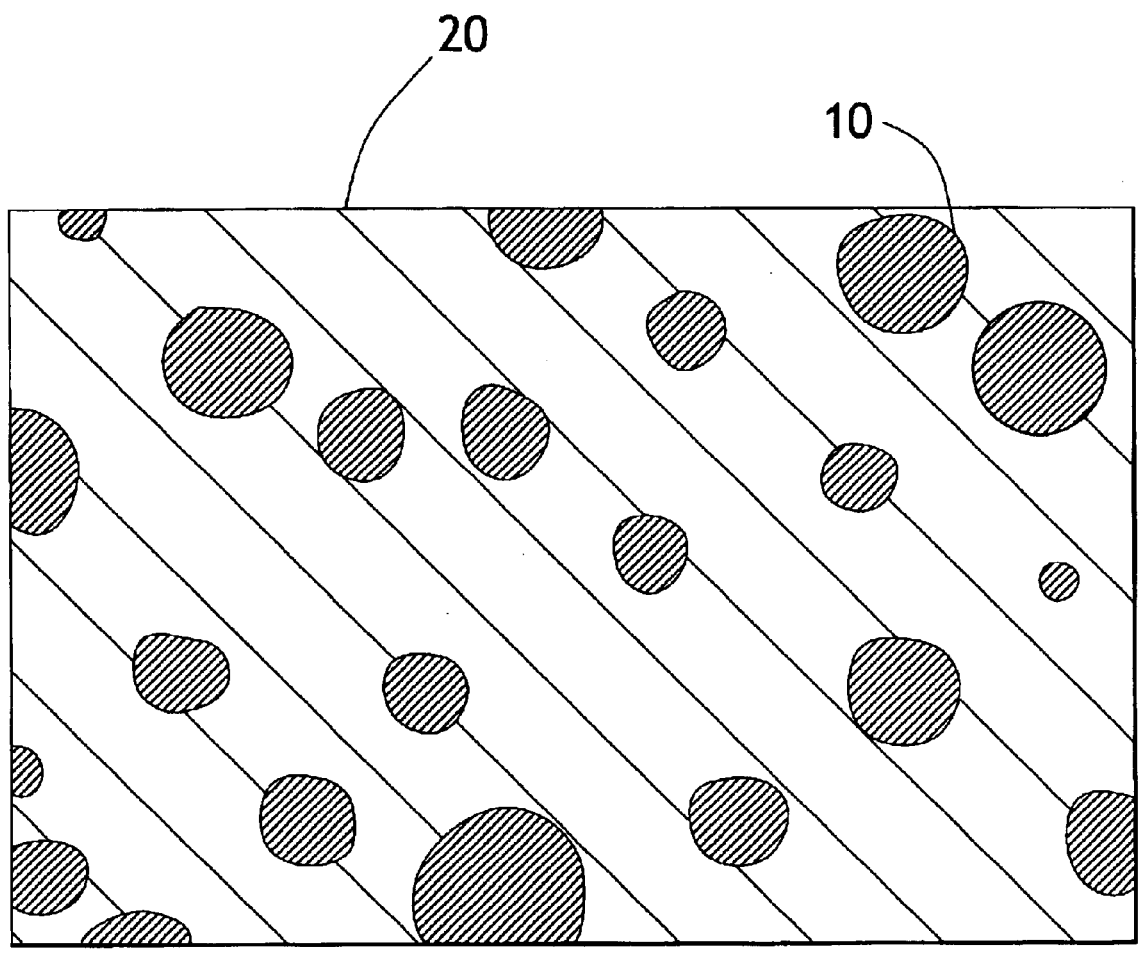
FIG. 1 is a cross section of a beryllium-aluminum alloy.

The cross section of FIG. 1 is illustrative of a beryllium-aluminum alloy. Zones of beryllium 10 are surrounded by aluminum 20. Beryllium and aluminum dissolve into each other to a concentration of less than 4%. Thus a Be—Al part is a composite material with distinct zones of beryllium and aluminum. The beryllium may be selectively removed, providing an aluminum rich surface. In the examples, substantially all of the beryllium is removed from the surface. However a surface would be considered aluminum rich if 80% or more of the beryllium originally present were removed. This surface may then be bonded to another aluminum rich surface.

Beryllium is removed as follows: the surface of a Be—Al alloy part is first abraded to remove surface oxides it is then subjected to acid etching. Hydrofluoric, nitric and sulfuric acids, either alone or in combination, is able to adequately remove the beryllium component from a surface, leaving an aluminum-enriched surface. The goal of etching is to remove most of the beryllium from the surface. Etch rates will vary dependent upon acid concentration, bath temperature, how expent the solution is before use. A fresh solution of 2.5% hydrofluoric acid (reagent grade, 49%), 15% nitric acid (reagent grade, 70%), and 82.5% deionized water should be able to etch the beryllium from a parts surface in less than 15 minutes. It may be helpful to use a coupon along side of the part while etching to monitor etch rates. Prior to acid etching the parts are cleans with acetone, scrubbed with an abrasive cleanser and rinsed in deionized water for 2 minutes. Following acid etching the parts are submersed in a rinse of deionized water, rinsed by flowing air agitated or deionized water for 5 minutes, blown dry using dry nitrogen and oven dried at 250 degrees F. for 15 minutes. The parts should be brazed or coated within 4 hours or sealed in a gas-tight bay (e.g. polyethylene) backfilled with dry nitrogen.

Following the production of an aluminum-enriched surface, the parts to be joined are assembled. At the joint location, a braze alloy is positioned. In brazing the aluminum enriched surfaces together, conventional fluxless braze allows with over 1.0% magnesium may be used. These include the braze alloys designated as 4004, and 4104. Each of these alloys include in their respective compositions (by weight): 9.0–10.0% silicon, no more than 0.25% copper, no more than 0.8% iron, no more than 0.20% zinc, 1.0–2.0% magnesium, and no more than 0.10% manganese. The 4104 alloy also includes between 0.02–0.20% bismuth. The balance of each alloy is aluminum. Each of these alloys is brazed at a temperature in the range of 588–604 degrees Celsius.

It is preferred that fluxless vacuum brazing is done in batches. Before beginning the brazing process a sufficient number of cleaned parts are obtained to produce the quantity of brazed assembly required. In handling such parts clean surgical gloves are used at all times. The Be—Al parts are checked to verify that the parts have previously been cleaned and that all gaps and cavities within the parts are vented. In addition the parts are inspected to verify that the thermocouple holes on the parts are appropriately located on the parts for brazing. For example, the thermocouple holes may be 0.070 inches diameter by 0.250 inches deep. For some weld protocols a minimum of one thermocouple hole is present on the part and at least three holes is desirable. In the present example the surfaces to be brazed should be flat within 0.0002 inches/inch. In addition the brazed faying surfaces are to have a 60 to 100 microinch finish. For the beginning of the braze process, the braze tooling should be inspected to ensure that the tooling is in good condition. The aluminum braze foil is cleaned by wiping with a lint-free fabric and acetone until all contamination is removed, followed by an isopropyl alcohol wipe.

The braze lay-up should be done on a movable cart or other fixture that will allow the assembly to be rolled into the furnace without destruction of the brazed lay-up. As noted earlier, the clean parts to be brazed have been treated to create an aluminum rich surface to be joined. Using clean surgical gloves the braze assembly is layed-up according to the specification drawings. The braze joints are checked to ensure that no gaps occur. The parts to be joined must be able to be placed in direct contact with each other. This may require mechanical alignment, using pins or some similar alignment means. It is preferred that the pins are a Be—Al alloy and can be left in the final assembly. Stainless steel pins may also be acceptable. It is important to check the pin orientation in the designer's specification to ensure proper lay-up. Further, it should ensured that pins are able to slip fit together so the parts can easily come together during brazing. The pins are cleaned using the above method.

The braze tooling and/or fixturing are designed so that a minimum of 50 lbs. per square inch of pressure will be placed across the braze faying surface. More pressure is desirable and typically a force of 250 lbs. per square inch is preferred.

The batch of brazed material is placed in a vacuum furnace. A minimum of 3 thermocouples are attached during each brazed batch. One of the thermocouples should be located in the center of the braze batch, one at the coldest point in the furnace from the center and one thermocoupled placed at the hottest point in the vacuum furnace from the center. Braze lay-up drawing should set out the required thermocouple location and required number of thermocouples required for a particular assembly. Such instructions may call for fewer or greater number of thermocouples based on the part size, configuration and quantities.

A steel container containing magnesium chips is placed in the vacuum furnace a minimum of six inches from the assembled parts. This container should contain at least six cubic inches of magnesium and not more than 17 cubic inches of magnesium.

The furnace is subsequently closed and the vacuum applied to the vacuum furnace to reach a final pressure of $10^{-5}$ Torr. The first temperature is set to 535° C. (995° F.) with the temperature ramp up at a rate not to exceed 10° C. (18° F.) per minute. The parts should be subjected to this temperature increase until they reach the preheat temperatures between 525 and 535° C. (995° F.). The parts are held at this temperature to allow the heat to soak into the parts for 15 minutes. After all thermocouples detect a stabilized temperature, the furnace temperature control should be set for 630° C. (1166° F.). The part assembly should be increased to 593° C. as quickly as possible (while maintaining the set vacuum through the entire braze cycle). All thermocouples should reach a minimum of 593° C. (1100° F.) for a period of 3 minutes. Immediately after expiration of this 3 minute interval, the furnace chamber is back filled with 760 Torr (one atmosphere) of dry nitrogen. The power is turned off to quickly drop the part temperature. This allows the parts to slow cool by keeping the chamber closed and allowing the system to cool naturally to avoid distorting the parts. Following the joining procedure the quality of the joints may be checked using a radio-graph, ultrasonic or mass spectrometer or other means to determine braze joint quality.

Figure 2:
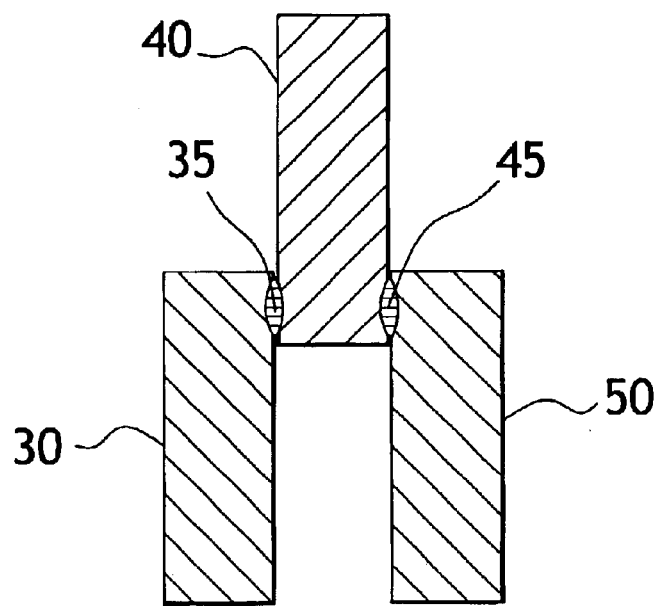
FIG. 2 is a side view of three joined beryllium-aluminum alloy parts.
Figure 3:
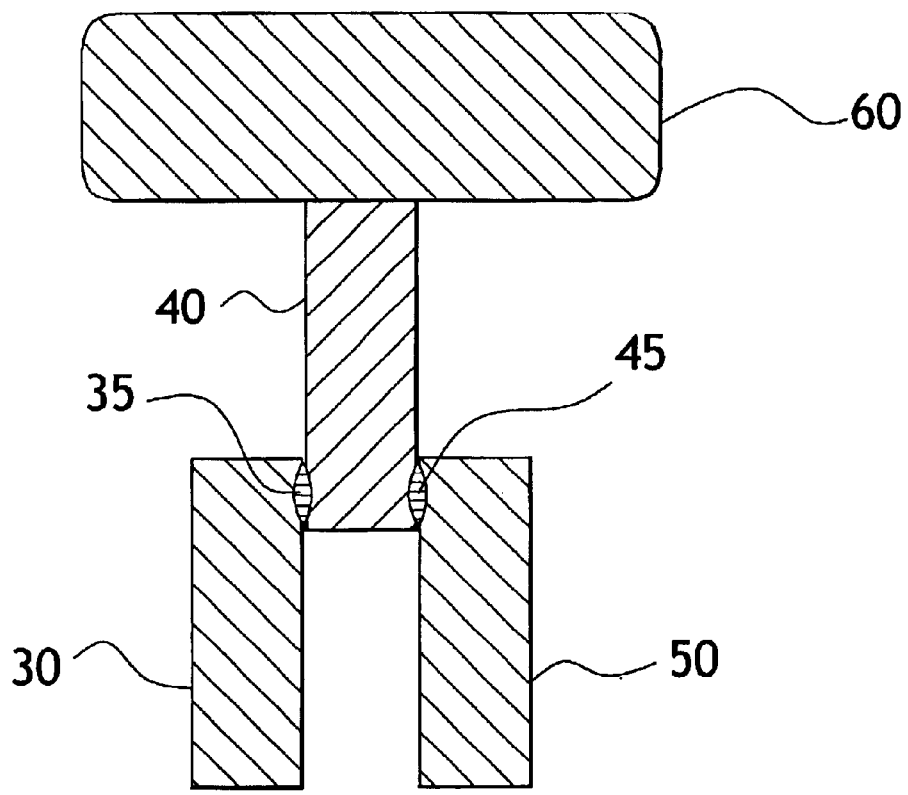
FIG. 3 is a side view of the test apparatus for determining the strength of the parts of FIG. 2.

A test of the bonding strength of brazed Be—Al parts showed the strength of the bonded parts. The set up, shown in FIG. 2, shows the attachment of parts. The parts, 30, 40, 50 are attached at joints 35, 45, with a central part 40 attached between two side parts 30, 50. In FIG. 3, the test set up shows that the central part 40 is subjected to the force from a test machine 60 that applies pressure to the part. The cross head movement at various applied loads may then be measured.

Twelve parts made of the alloy AlBeMet (38% aluminum and 62% Beryllium) were used in this test. Six parts were bonded using Eccobond 285 (Emerson & Cuming, Canton, Mass. adhesive.

Prior to either adhesive bonding or brazing the parts are cleaned. Initially the parts are wiped with lint-free cloth using acetone. The appropriate surfaces to be joined are set up according to the instruction plan for joining the parts. The parts then are scrubbed with an abrasive pad using a cleanser. This is done to produce a surface free of water breaks. The parts are then rinsed in air agitated or flowing deionized water for 2 minutes.

In the instance of epoxy bonding the surface preparation is important because of the formation of oxide layers. Be—Al parts are prepared Using a coating of BR-127, a phenolic epoxy primer sold by American Cyanamid Co. (Havre de Grace, Md.). This coating inhibits corrosion. As is set out in the protocol unless otherwise specified by the work constructions. It is also possible to bond bare but cleaned Be—Al surfaces given that BR-127 "seals" surface after cleaning and subsequent bonding to this primer. The results will be is similar to the results obtained using bare Be—Al parts. Prior to bonding it should be verified that all the testing material including weights and test cells have been properly calibrated. In addition the user should verify that the adhesives to be used have not passed their shelf life requirements.

It is preferred that prior to the bonding procedure a dry bonding run is carried out. Once an engineer has verified that the personnel performing the test understands the steps to be employed and has ensured that all processes of materials and fixtures are present the test may commerce. A set of lap shear Be—Al parts are checked and verified for quality assurance. Once quality assurance has verified that the test operator has been properly trained to carry out the test, the bonding of the parts may take place. Bonding requires 4 hours after mixing the Eccobond 285 with the appropriate catalyst 24 LV.

Clean powder free latex gloves are used during all bonding operations and handling of hardware at all times. The test area should be clean, free of contaminating particulates in the air, and preferably at a separate location apart from the fabrication shop. Prior to bonding the surfaces should be expected to verify that they have been properly prepared. The surfaces should also be wiped down using lint-free fabric and acetone followed by isopropyl alcohol.

To prepare bonding adhesive 100 parts of Eccobond 285 is mixed with 8 parts of the catalyst 24 LV. The mixture is stirred to ensure that it is homogenous. A minimum of 27 grams of adhesive is mixed per batch. The temperature and humidity are recorded. In addition the amount of adhesive mix, the start time for mixing and the time when the adhesive is applied is also recorded. At the location of the bonded surfaces a coating of the adhesive is applied. The coating should be sufficient to produce an ample amount of squeezed out adhesive when pressure is applied to the parts. The parts bonded using the protocol ASTM D1002. (Edition approved Feb. 15, 1994 and published April 1994) Any residual adhesive and lay in fillets are removed using swabs and isopropyl alcohol. The parts then cured at room temperature for 24 hours. After bonding the parts are inspected to verify that no cracks or delaminations are present. A minimum fillet of 0.06 inch is verified to be present at the proper location. In addition the adhesive should be fully cured to the touch. Any excess adhesive is allowed to cure and is then disposed of.

Six parts were joined using the vacuum brazing technique described above using the above-described methods. Prior to joining all parts were cleaned as indicated above. Three parts of each group of six joined parts were subjected to thermal cycles. These parts were cycled from room temperature to 30 degrees Kelvin, held at this temperature for one hour, and returned to room temperature. This cycle was repeated twenty times.

TABLE 1

Individual Test Results

| Specimen Configuration | Condition | Failure Load (lbs) | *Shear Strength (psi) |
|---|---|---|---|
| Brazed AlBeMet | Thermal Cycled | 5,095 | 6,973 |
| | | 4,309 | 5,745 |
| | | 6,709 | 8,945 |
| | Control | 4,864 | 6,485 |
| | | 5,036 | 6,715 |
| | | 5,460 | 7,280 |
| Bonded AlBeMet | Thermal Cycled | 3,390 | 4,520 |
| | | 4,191 | 5,588 |
| | | 2,418 | 3,224 |
| | Control | 3,200 | 4,267 |
| | | 3,026 | 4,035 |
| | | 3,801 | 5,068 |

*calculated on a bond area of 0.75 in$^2$

FIGS. 4 and 5 and Table 1 (above) show the results of this test. Generally, the brazed specimens show increased shear strength and higher failure load than the bonded specimens. This is true for both control parts and thermal cycled parts. These test results are relative values. The test set up allows for out of plane and bending loads to come into play. If pure shear or tensile values are required additional tests to establish these specific values should be undertaken.

A number of alternative means of bonding aluminum parts are known. These include dip brazing in which the parts to be joined are submerged into a bath of molten flux.

Alternatively, torch brazing has been used to join aluminum parts. In this method, a filler rod and a flux are heated by a torch at a joint location. The filler rod forms a fillet at the joint. The vacuum brazing is one example of brazing techniques. In addition, alternative brazing techniques include air furnace brazing and controlled atmosphere brazing. In either of these methods, a flux would be used along with the brazing alloy. However, this produces braze joints that are less resistant to corrosion and is a more sensitive process than the fluxless vacuum brazing. Fluxless vacuum surface brazing of Be—Al alloy parts allows joining of large faying surfaces while eliminating flux entrapment.

As noted in patent application Ser. No. 08/939,762, the surface of the part may be subsequently coated, as by using an alumina-titania coating. This process requires first cleaning the Be—Al part, followed by application of the coating.

The present method may be used to attach Be—Al parts together, by formation of an aluminum-enriched surface on each part. Alternatively, one Be—Al part may be subjected to the process of creating an aluminum enrich surface to allow this surface to be attached to an aluminum part, or attached to an aluminum coating on another part.

To clean the parts, the parts are wiped with acetone. The appropriate features are then masked according to the work instructions and the parts are scrubbed with an adhesive pad and a cleanser to achieve surface which is free of water breaks. The part is then rinsed in air agitated or flowing deionized water for 2 minutes.

The part is going to be etched to remove beryllium component. The part is etched with a hydrofluoric-nitric acid solution at room temperature to uniform matte finish according to the work constructions. A test part is utilized to verify etch rates prior to etching the parts. A properly etched part will have a white appearing surface in comparison to an unetched beryllium aluminum part. The acid solution is used in about the sufficient size to accommodate the parts to be etched. The solution is 2.5% hydrofluoric acid (reagent grade, 49%), 15% nitric acid (reagent grade, 70%), and 82.5% deionized water.

Following acid etching the parts are rinsed in deionized water rinse tank at ambient temperature. The rinse tank should be sufficient to immerse the parts. Following the water rinse the parts are rinsed in air agitated or flowing deionized water at ambient temperature for 5 minutes minimum. The parts then are dried using blown nitrogen. This is followed by oven drying at 250 degrees F. for 15 minutes. Following this etching procedure the parts should either be brazed, coated or bonded within 4 hours or sealed in a polyethylene bag back-filled with dry nitrogen.

What is claimed is:

1. A method for joining metal parts, comprising:

selectively removing beryllium from a surface of an aluminum-beryllium alloy part, designated a first part to form a first aluminum rich surface;

brazing the first aluminum rich surface of said first part to a second aluminum rich surface on a second part, using a brazing alloy.

2. A method of claim 1, wherein removing beryllium from a surface of an aluminum-beryllium alloy part includes acid etching the aluminum-beryllium alloy part.

3. The method of claim 2, wherein said etching includes exposing the aluminum-beryllium alloy part to a solution of hydrofluoric said and nitric acid.

4. The method of claim 1, wherein said brazing step is fluxless vacuum brazing.

5. The method of claim 4, wherein said fluxless vacuum brazing uses a braze alloy selected from the group consisting of braze alloy 4004 and 4104.

6. A method for joining metal parts, comprising:

a) cleaning a first and a second metal parts;

b) selectively removing beryllium from a surface of an aluminum-beryllium alloy on said first part to form a first aluminum rich surface;

c) aligning said first aluminum rich surface with a second aluminum rich surface on the second metal part; and d) brazing the first aluminum rich surface on the first part to the second aluminum rich surface on the second part to join said first and second parts.

7. A method of claim 6, wherein removing beryllium from a surface of an aluminum-beryllium alloy part includes acid etching the aluminum-beryllium alloy part.

8. The method of claim 6, wherein said etching includes exposing the aluminum-beryllium alloy part to a solution of hydrofluoric said and nitric acid.

9. The method of claim 6, wherein said brazing step is fluxless vacuum brazing.

10. The method of claim 6, wherein said fluxless vacuum brazing uses a braze alloy selected from the group consisting of braze alloy 4004 and 4104.

11. The method of claim 6, wherein both said first and said second parts are made of a beryllium-aluminum alloy, and said first and second aluminum rich surfaces are generated by selective removal of beryllium.

* * * * *